United States Patent
Yang et al.

(10) Patent No.: US 9,398,391 B2
(45) Date of Patent: Jul. 19, 2016

(54) STEREO WIDENING OVER ARBITRARILY-CONFIGURED LOUDSPEAKERS

(71) Applicant: Creative Technology Ltd, Singapore (SG)

(72) Inventors: Jun Yang, San Jose, CA (US); Robert Ridder, Santa Cruz, CA (US); Steven Verity, Santa Clara, CA (US)

(73) Assignee: Creative Technology Ltd, Singapore (SG)

( * ) Notice: Subject to any disclaimer, the term of this patent is extended or adjusted under 35 U.S.C. 154(b) by 43 days.

(21) Appl. No.: 14/399,286

(22) PCT Filed: May 29, 2013

(86) PCT No.: PCT/US2013/042953
§ 371 (c)(1),
(2) Date: Nov. 6, 2014

(87) PCT Pub. No.: WO2013/181172
PCT Pub. Date: Dec. 5, 2013

(65) Prior Publication Data
US 2015/0125010 A1 May 7, 2015

Related U.S. Application Data

(60) Provisional application No. 61/652,813, filed on May 29, 2012.

(51) Int. Cl.
| H04S 7/00 | (2006.01) |
| H04R 3/14 | (2006.01) |
| H04R 5/02 | (2006.01) |
| H01S 1/00 | (2006.01) |
| H04S 3/00 | (2006.01) |
| H04R 5/04 | (2006.01) |

(52) U.S. Cl.
CPC ... *H04S 7/30* (2013.01); *H01S 1/00* (2013.01); *H04R 3/14* (2013.01); *H04R 5/02* (2013.01); *H04S 7/302* (2013.01); *H04R 5/04* (2013.01); *H04S 3/00* (2013.01)

(58) Field of Classification Search
CPC .............. H04R 3/14; H04R 5/02; H04R 5/04; H04S 3/00; H04S 7/30; H04S 7/302; H04S 1/00
USPC .................................. 381/300, 1, 17
See application file for complete search history.

(56) References Cited

FOREIGN PATENT DOCUMENTS

| CN | CN1901761 A | 1/2007 | |
| CN | CN1946247 A | 4/2007 | |
| NL | WO 2007004147 A2 * | 1/2007 | ............... H04R 5/02 |
| WO | WO2007004147 A2 | 1/2007 | |

* cited by examiner

*Primary Examiner* — Paul S Kim
(74) *Attorney, Agent, or Firm* — Russell Swerdon; Desmund Gean

(57) ABSTRACT

A system and method are disclosed for effective and simple stereo widening over arbitrarily-configured speakers and its real-time implementation. According to one embodiment, the system includes five processing units: (1) elevation processing unit; (2) side signal or difference signal processing unit; (3) center signal processing unit; (4) binaural signal processing unit; and (5) stereo limiter (to prevent the clipping) unit. Any of the five processing units may be included or omitted depending on the application. In general, embodiments of the present invention provide effective and simple stereo widening schemes with good audio quality results, but without having substantial requirements on the speakers' positional configuration. For example, the proposed schemes can apply to both symmetric and non-symmetric stereo loudspeakers.

20 Claims, 6 Drawing Sheets

STEREO WIDENING OVER ARBITRARILY-CONFIGURED LOUDSPEAKERS

BACKGROUND OF THE INVENTION

1. Field of the Invention

The present invention relates to processing signals. More particularly, the present invention relates to a system and method for processing audio signals.

2. Description of the Related Art

A traditional stereo loudspeaker system setup typically includes a left speaker and a right speaker both positioned on the same horizontal plane with each speaker being equal distance from the listener, i.e., the traditional stereo loudspeaker system is of symmetric configuration. There are three major techniques for symmetrically configured stereo speakers to expand their corresponding sound fields. These techniques include a delaying tactics approach, a polar exploration approach, and a split EQ approach.

In the delaying tactics approach, a small delay is introduced into one side of a stereo signal. Very short delays, of the order of a few milliseconds, are not generally perceived as echoes, but as changing the apparent position of the source signal within the stereo field. Once the delays get beyond 5 ms, the effect is less obvious. However, as the delays extend beyond 15 ms, the ear of the listener will be able to increasingly distinguish the delayed signal as a separate sound, which is not desirable.

The polar exploration approach is to take a little of the left channel, reverse the polarity and mix it into the right channel, and vice versa.

In the split EQ approach, complementary EQ settings on the left and right channels will emphasize the differences between them; thus, creating more sense of width. This produces a very subtle width enhancement provided that the EQ settings are matched accurately.

All the above approaches are not applicable for non-symmetric stereo speaker systems (e.g., in which speakers are positioned very close to each other and/or positioned on different horizontal planes). Further, the above approaches often generate very subtle enhancements even for symmetric stereo speakers systems.

Accordingly, goals of this invention include addressing the above problems by providing an effective and simple stereo widening system and its real-time implementation.

SUMMARY OF THE INVENTION

The present invention relates to a system and method for processing audio signals. In general, embodiments of the present invention provide effective and simple stereo widening schemes with good audio quality results, but without having substantial requirements on the speakers' positional configuration (e.g., physical placement). For example, the proposed schemes can apply to both symmetric and non-symmetric stereo loudspeakers.

According to one aspect of the invention, a stereo widening system for a stereo signal reproducible on a pair of arbitrarily-positioned loudspeakers in a listening space includes: an elevation processing unit, a side signal processing unit, and a center signal processing unit. The elevation processing unit is operable to receive the stereo signal and generate a first output signal having added elevation and enhanced sound brightness to the stereo signal and adjusted for the arbitrary-positioned loudspeakers. The side signal processing unit is operable to receive the first output signal and generate a second output signal having a widened stereo image to the stereo signal and adjusted for the arbitrary-positioned loudspeakers. The center signal processing unit is operable to receive the second output signal and generate a third output signal having a further widened stereo image to the stereo signal and adjusted for the arbitrary-positioned loudspeakers.

According to various embodiments, the stereo widening system may include a binaural signal processing unit. The binaural signal processing unit is operable to receive the third output signal and generate a fourth output signal having a positioned sound image of the stereo signal in the listening space. The binaural signal processing unit includes ipsilateral filters and contralateral filters implemented by first order IIR filters. The system may also include a stereo limiter unit. The stereo limiter unit is operable to receive the fourth output signal and generate a fifth output signal having clipping minimized from the fourth output signal.

According to another aspect of the invention, a method for stereo widening of a stereo signal reproducible on a pair of arbitrarily-positioned loudspeakers in a listening space is provided. The method includes: receiving at an elevation processing unit the stereo signal and generating a first output signal having added elevation and enhanced sound brightness to the stereo signal and adjusted for the arbitrary-positioned loudspeakers; receiving at a side signal processing unit the first output signal and generating a second output signal having a widened stereo image to the stereo signal and adjusted for the arbitrary-positioned loudspeakers; and receiving at a center signal processing unit the second output signal and generating a third output signal having a further widened stereo image to the stereo signal and adjusted for the arbitrary-positioned loudspeakers.

According to various embodiments, the method may include receiving at a binaural signal processing unit the third output signal and generating a fourth output signal having a positioned sound image of the stereo signal in the listening space. The binaural signal processing unit comprises ipsilateral filters and contralateral filters implemented by first order IIR filters. The method may also include receiving at a stereo limiter unit the fourth output signal and generating a fifth output signal having clipping minimized from the fourth output signal.

Any of the processing units or processing steps may be included or omitted or rearranged depending on the specific application.

The invention extends to a machine readable medium embodying a sequence of instructions that, when executed by a machine, cause the machine to carry out any of the methods described herein.

The system or method for stereo widening can generate an enhanced sound field, increased immersion and added spaciousness for symmetric, non-symmetric stereo speakers and any other arbitrarily-configured loudspeakers/drivers. It is even applicable to headphone listening situations.

These and other features and advantages of the present invention are described below with reference to the drawings.

DETAILED DESCRIPTION OF PREFERRED EMBODIMENTS

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to such preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known mechanisms have not been described in detail in order not to unnecessarily obscure the present invention.

It should be noted herein that throughout the various drawings like numerals refer to like parts. The various drawings illustrated and described herein are used to illustrate various features of the invention. To the extent that a particular feature is illustrated in one drawing and not another, except where otherwise indicated or where the structure inherently prohibits incorporation of the feature, it is to be understood that those features may be adapted to be included in the embodiments represented in the other figures, as if they were fully illustrated in those figures. Unless otherwise indicated, the drawings are not necessarily to scale. Any dimensions provided on the drawings are not intended to be limiting as to the scope of the invention but merely illustrative.

A traditional stereo loudspeaker system setup typically includes a left speaker and a right speaker both positioned on the same horizontal plane with each speaker being equal distance from the listener. This setup is known as a symmetric stereo loudspeaker system. However, there are instances where non-symmetric stereo loudspeaker systems are needed for implementation into products in the consumer electronics markets. In one exemplary non-symmetric system, the left and right speakers are built into a single tower (e.g., vertically stacked configuration) on different horizontal planes. The distance between the two speakers is much closer than that of the symmetric stereo system, which presents a challenge for stereo widening. Traditional stereo widening and enhancement methods can not be used very well in these non-symmetric speaker systems; hence, new methods which can produce an improved stereo-widening effect in a non-symmetric case are highly desirable.

In general, embodiments of the present invention provide effective and simple stereo widening schemes with good audio quality results, but without having substantial requirements on the speakers' positional configuration. For example, the proposed schemes can apply to both symmetric and non-symmetric stereo loudspeakers.

Figure 1:
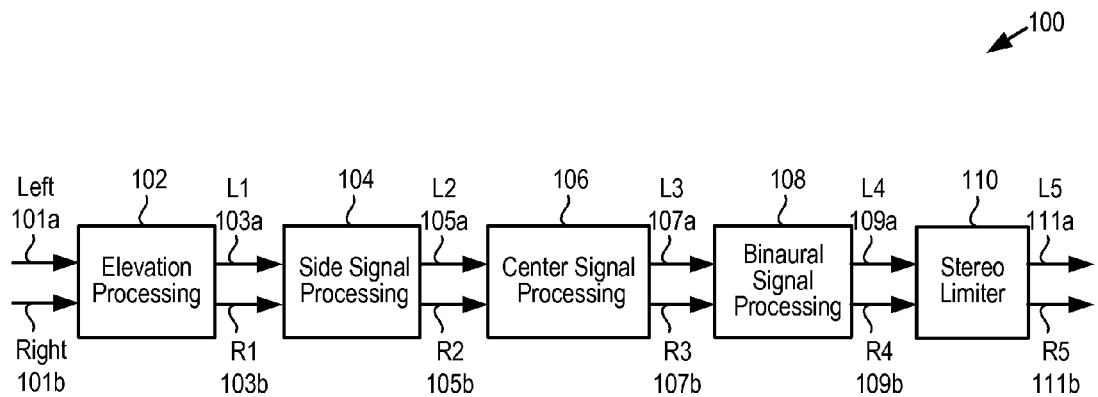
FIG. 1 is a schematic block diagram illustrating a system with a proposed stereo widening scheme implemented according to various embodiments of the present invention.

FIG. 1 is a schematic block diagram illustrating a system 100 with a proposed stereo widening scheme implemented according to various embodiments of the present invention. System 100 mainly includes five processing units: (1) elevation processing unit 102; (2) side signal or difference signal processing unit 104; (3) center signal processing unit 106; (4) binaural signal processing unit 108; and (5) stereo limiter (to prevent the clipping) unit 110. A stereo signal input with a left channel signal 101a and a right channel signal 101b is processed by the five processing units in generating respective stereo signal outputs 103a and 103b; 105a and 105b; 107a and 107b; 109a and 109b; 111a and 111b.

The proposed stereo widening scheme can generate an enhanced sound field, increased immersion, and added spaciousness for symmetric stereo speakers, non-symmetric stereo speakers and any other arbitrarily-configured (e.g., arbitrarily-positioned) loudspeakers. It is even applicable to headphone listening situations.

Figure 2:
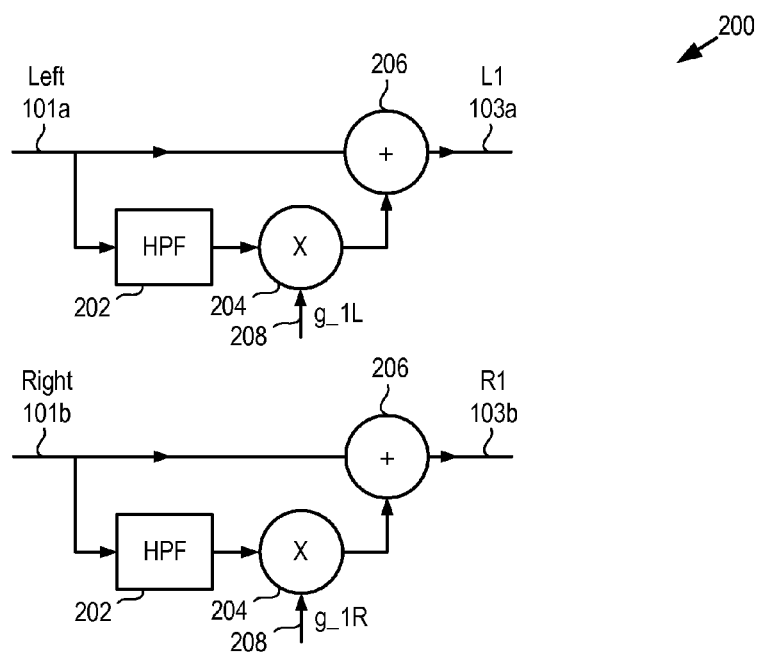
FIG. 2 is a schematic block diagram illustrating an elevation processing unit according to various embodiments of the present invention.

FIG. 2 is a schematic block diagram 200 illustrating an elevation processing unit 102 according to various embodiments of the present invention. Elevation processing unit 102 consists at least a HPF (high-pass filter) 202, multiplier 204, and adder 206 for each channel signal (e.g., left channel signal 101a, right channel signal 101b) of a stereo signal input. Gains 208 (e.g., g_1L, g_1R) for the multipliers 204 may be set at any suitable value depending on the specific application. In a preferred embodiment, gains 208 are between 0.0 and 1.0 and are adjusted according to the directions and distances from the corresponding loudspeakers to the user (e.g., listener). The adjustments may be performed manually or automatically in real-time. In general, g_1L equals to g_1R when the stereo loudspeaker is symmetric to the user. In a preferred embodiment, HPFs 202 are identical. Accordingly, elevation processing unit 102 processes input signals (e.g., 101a, 101b) in generating corresponding output signals L1, R1 (e.g., 103a, 103b). Elevation processing unit 102 not only adds some elevation to the sound field, but also enhances the brightness of the sound.

Figure 3:
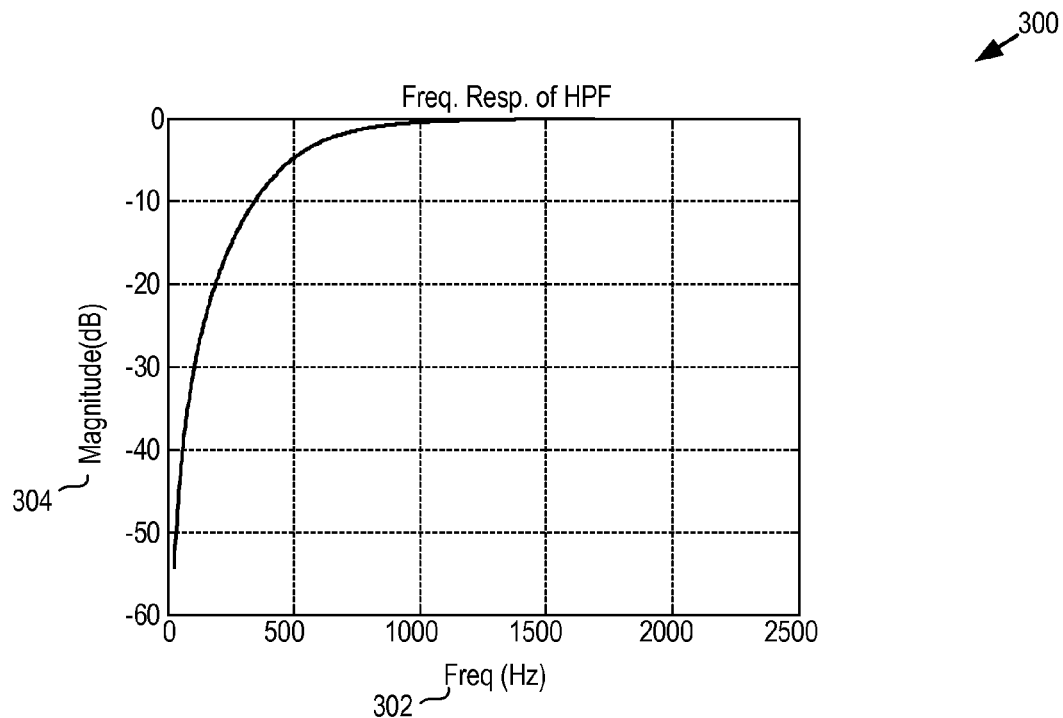
FIG. 3 is a diagram illustrating a frequency response of a HPF (high-pass filter) according to various embodiments of the present invention.

FIG. 3 is a diagram 300 illustrating a frequency response of a HPF (e.g., 202) according to various embodiments of the present invention. HPF is configured to allow higher frequencies to pass through while attenuate lower frequencies. For example, in diagram 300, frequencies 302 below 1500 Hz drop off considerably in magnitude (dB) 304.

Figure 4:
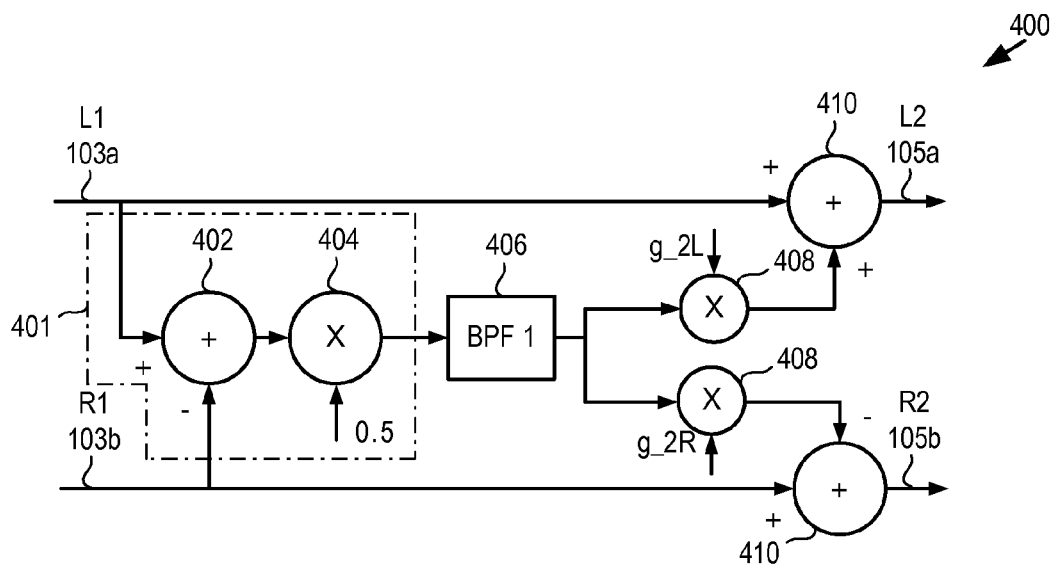
FIG. 4 is a schematic block diagram illustrating a side signal processing unit according to various embodiments of the present invention.

Widening of the stereo image can be achieved by manipulating the relationship of the side signal and the center signal. With regard to manipulating the relationship of the side signal, FIG. 4 is a schematic block diagram 400 illustrating a side signal processing unit 104 according to various embodiments of the present invention. The side signal is determinable by (L1−R1)*0.5. Therefore, as shown in FIG. 4, the side signal is determined by a side signal determination block 401 that subtracts R1 from L1 via adder 402 and then divides the resultant by half via multiplier 404. The side signal is then processed/manipulated through a band-pass filter 406 (BPF 1), multipliers 408 with separate gains g_2L and g_2R, and adders 410. In a preferred embodiment, the processed side signal is added to L1 but subtracted from R1. The gains g_2L and g_2R are between 0.0 and 1.0 and are adjusted according to the directions and distances from the corresponding loudspeakers/drivers to the user. The adjustments may be performed manually or automatically in real-time. In general, g_2L equals to g_2R when the stereo loudspeaker is symmetric to the user. Accordingly, side signal processing unit 104 processes input signals L1, R1 (e.g., 103a, 103b) in generating corresponding output signals L2, R2 (e.g., 105a, 105b).

Figure 5:
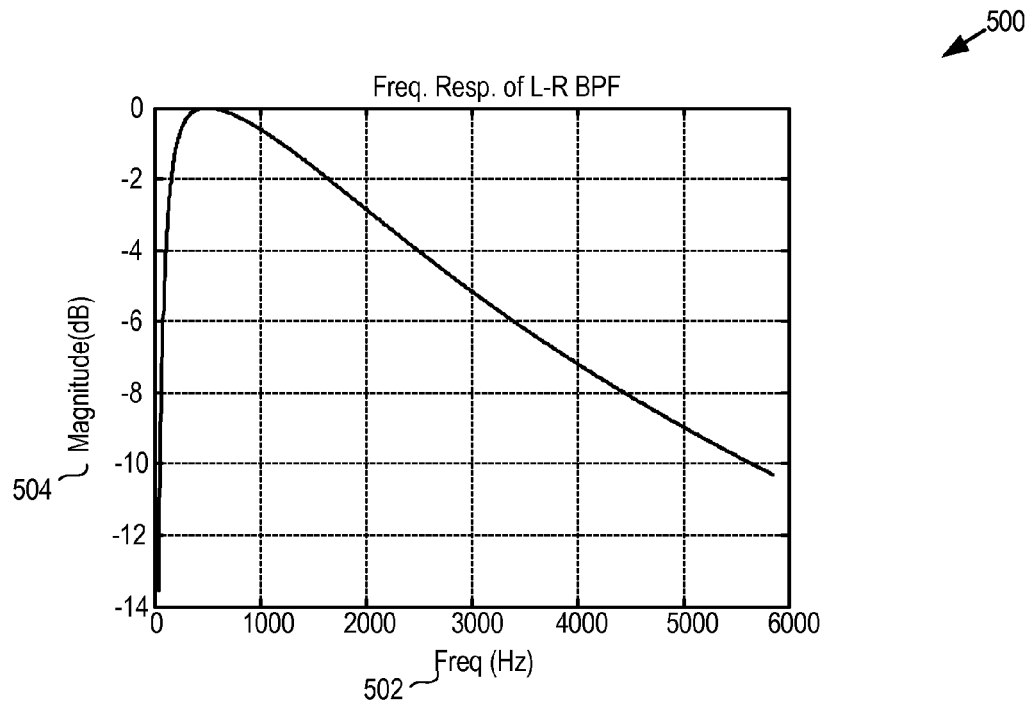
FIG. 5 is a diagram illustrating a frequency response of a BPF (band-pass filter) in a side signal processing unit according to various embodiments of the present invention.

FIG. 5 is a diagram 500 illustrating a frequency response of a BPF (band-pass filter) (e.g., 406) in a side signal processing unit 104 according to various embodiments of the present invention. BPF is configured to pass a specific frequency band and attenuate other frequency bands (e.g., frequencies above and below the specific frequency band). For example, in diagram 500, frequencies 502 between 400 Hz and 600 Hz peak in magnitude (dB) 504 while frequencies below 400 Hz and above 600 Hz drop off considerably in magnitude (dB) 504.

Figure 6:
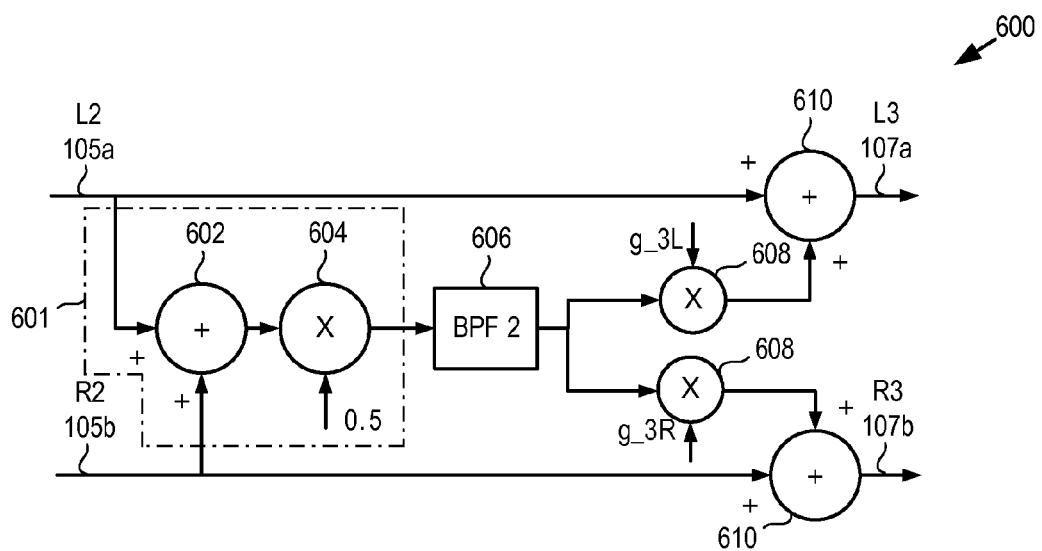
FIG. 6 is a schematic block diagram illustrating a center signal processing unit according to various embodiments of the present invention.

With regard to manipulating the relationship of the center signal, FIG. 6 is a schematic block diagram 600 illustrating a center signal processing unit 106 according to various embodiments of the present invention. The center signal is determinable by (L2+R2)*0.5. Therefore, as shown in FIG. 6, the center signal is determined by a center signal determination block 601 that adds L2 to R2 via adder 602 and then divides the resultant by half via multiplier 604. The center signal is then processed/manipulated through a band-pass filter 606 (BPF 2), multipliers 608 with separate gains g_3L and g_3R, and adders 610. In a preferred embodiment, the processed center signal is added to L2 and R2. The gains g_3L and g_3R are between 0.0 and 1.0 and are adjusted according to the directions and distances from the corresponding loudspeakers/drivers to the user. The adjustments may be performed manually or automatically in real-time. In general, g_3L equals to g_3R when the stereo loudspeaker is symmetric to the user. Accordingly, center signal processing unit 106 processes input signals L2, R2 (e.g., 105a, 105b) in generating corresponding output signals L3, R3 (e.g., 107a, 107b).

Figure 7:
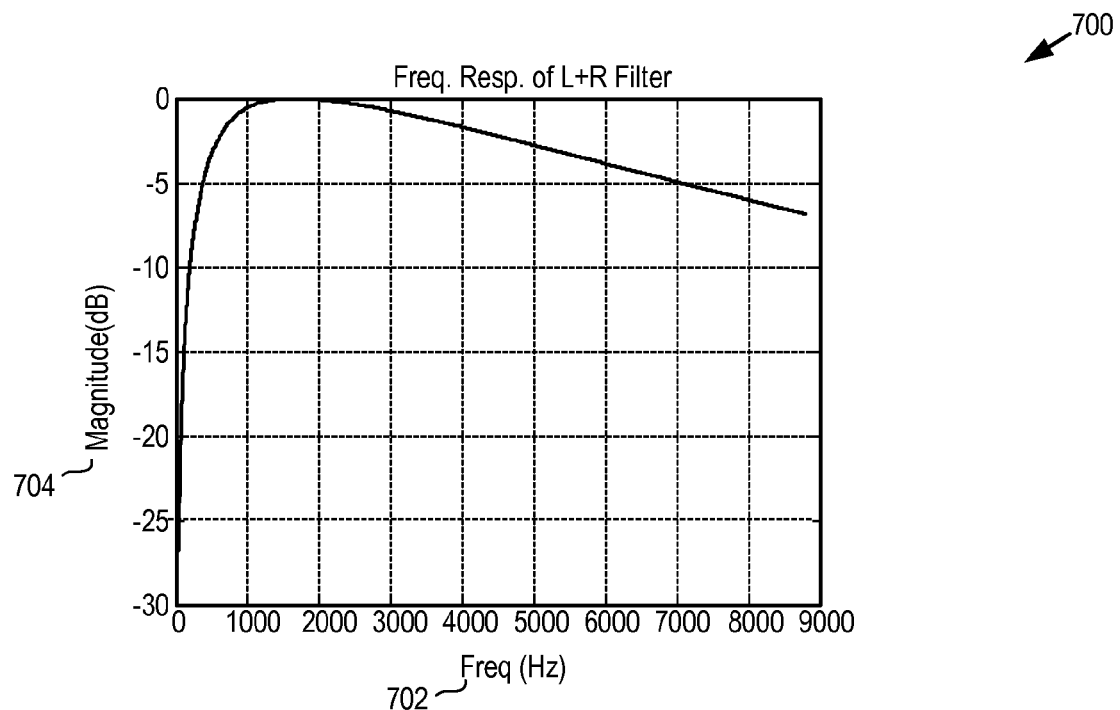
FIG. 7 is a diagram illustrating a frequency response of a BPF in a center signal processing unit according to various embodiments of the present invention.

FIG. 7 is a diagram 700 illustrating a frequency response of a BPF (e.g., 606) in a center signal processing unit 106 according to various embodiments of the present invention. BPF is configured to pass a specific frequency band and attenuate other frequency bands (e.g., frequencies above and below the specific frequency band). For example, in diagram 700, frequencies 702 between 1500 Hz and 2000 Hz peak in magnitude (dB) 704 while frequencies below 1500 Hz and above 2000 Hz drop off considerably in magnitude (dB) 704.

Figure 8:
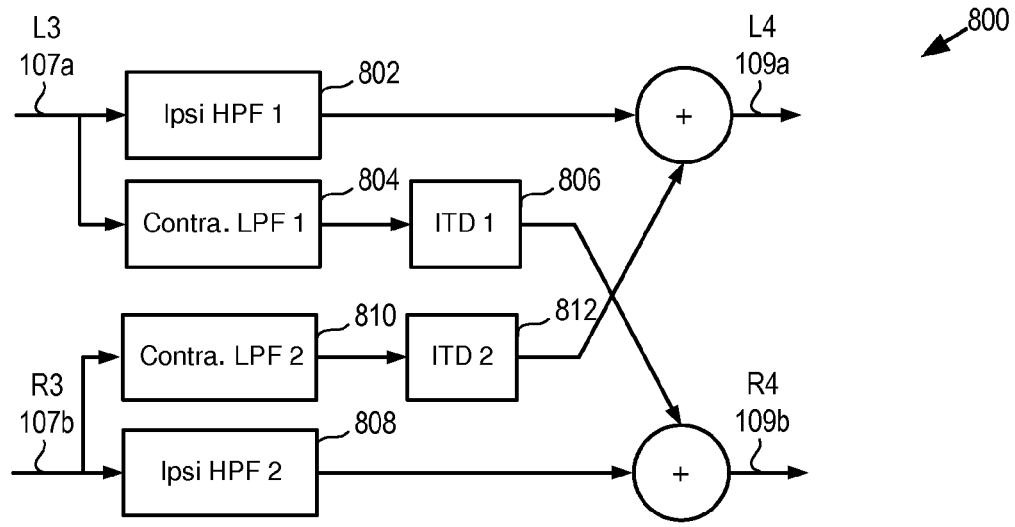
FIG. 8 is a schematic block diagram illustrating a binaural signal processing unit according to various embodiments of the present invention.

Binaural synthesis technology uses head related transfer functions (HRTFs) to position the image of sound in any location with headphones and loudspeakers. As a result, the positioned location could be beyond the physical speakers for the speaker case. FIG. 8 is a schematic block diagram 800 illustrating a binaural signal processing unit 108 according to various embodiments of the present invention. As shown in FIG. 8, the ipsilateral filters (HRTFs) 802, 808; the contralateral filters (HRTFs) 804, 810; and the interaural time differences ITDs 806, 812 for the corresponding loudspeakers are adopted. For a symmetric loudspeaker configuration, "Ipsi HPF 1" 802, "Contra. LPF 1" 804, and "ITD 1" 806 are identical to "Ipsi HPF 2" 808, "Contra. LPF 2" 810, and "ITD 2" 812, respectively. Accordingly, binaural signal processing unit 108 processes input signals L3, R3 (e.g., 107a, 107b) in generating corresponding output signals L4, R4 (e.g., 109a, 109b).

Figure 9:
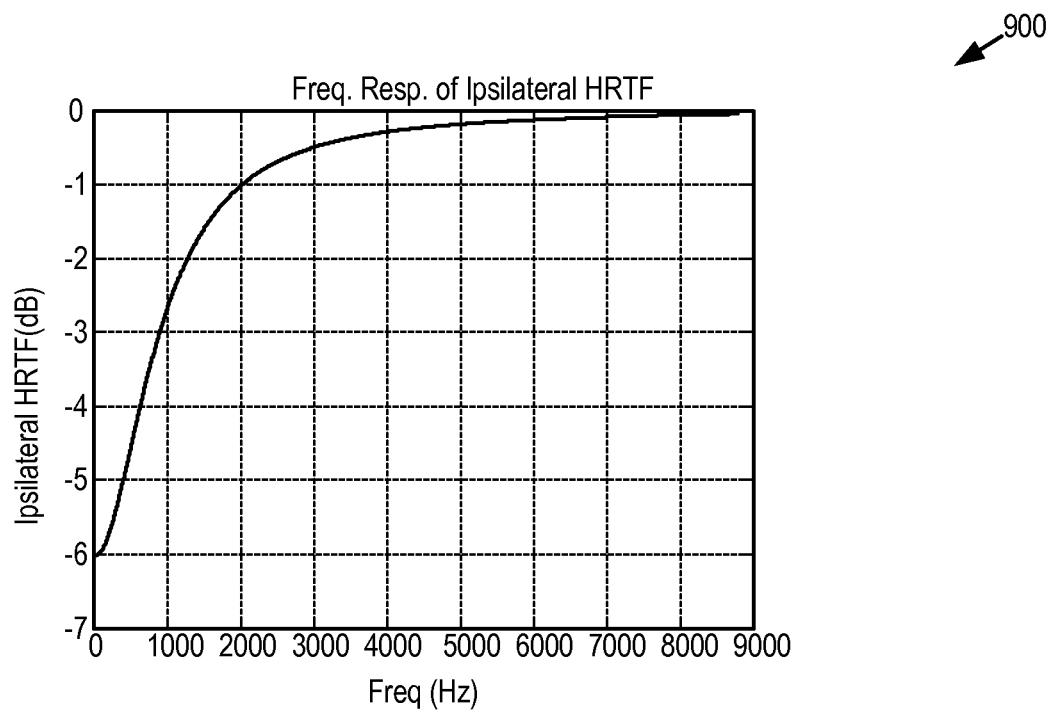
FIG. 9 is a diagram illustrating a frequency response of an ipsilateral filter HRTF (head related transfer function) according to various embodiments of the present invention.
Figure 10:
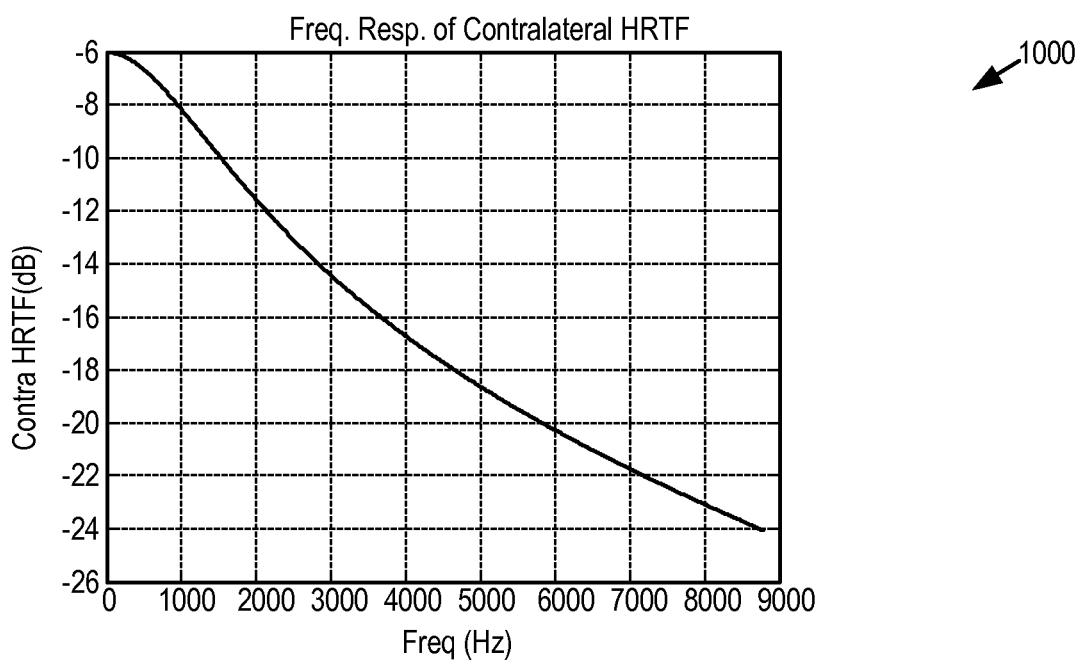
FIG. 10 is a diagram illustrating a frequency response of a contralateral filter HRTF according to various embodiments of the present invention.

FIG. 9 is a diagram 900 illustrating a frequency response of an ipsilateral filter HRTF 802, 808 whereas FIG. 10 is a diagram 1000 illustrating a frequency response of a contralateral filter HRTF 804, 810 according to various embodiments of the present invention. FIGS. 9 and 10 are examples of "Ipsi HPF" 802, 808 and "Contra. LPF" 804, 810 which are implemented by first order IIR filters. Traditionally, HRTFs are implemented by FIR filters with long taps, or by IIR filters with higher order.

Figure 11:
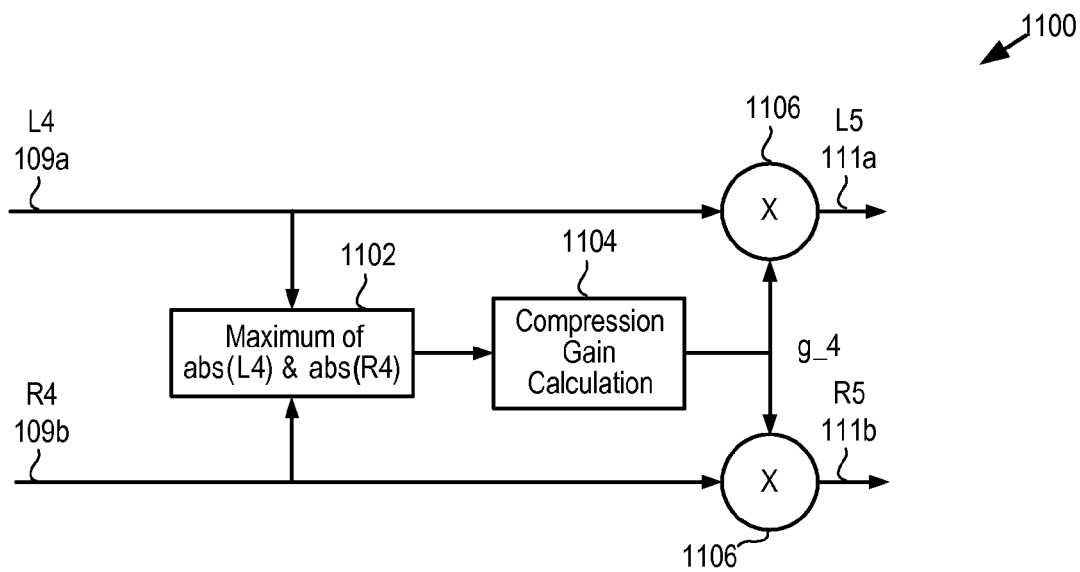
FIG. 11 is a schematic block diagram illustrating a stereo limiter according to various embodiments of the present invention.

In order to minimize or avoid clipping, a stereo limiter can be optionally used in post-processing. FIG. 11 is a schematic block diagram 1100 illustrating a stereo limiter 110 according to various embodiments of the present invention. The input signals L4, R4 (e.g., 109a, 109b) are processed by a maximum value determiner 1102, compression gain calculator 1104, and multipliers 1106. Maximum value determiner 1102 is configured to calculate and determine the maximum absolute values of input signals L4 and R4. Compression gain calculator 1104 is generally configured to narrow/reduce/compress an input signal's L4, R4 dynamic range based on its maximum absolute values as determined in maximum value determiner 1102. Applying the same gain g_4 via multipliers 1106 to both the left and right channels L4, R4 will keep the stereo sound image unchanged. Many available technologies could be used for the compression gain calculator 1104. Accordingly, stereo limiter unit 110 processes input signals L4, R4 (e.g., 109a, 109b) in generating corresponding output signals L5, R5 (e.g., 111a, 111b).

The proposed system/scheme is applicable to any related technology/scheme/IP to widen stereo image over the non-symmetric stereo speakers or arbitrarily-configured loudspeakers. Generally, the proposed system is a self-contained technology to enhance audio effects and can accept any existing mono-channel and stereo-channel audio signals such as MP3, WMA, MIDI, digital TV, digital broadcast radio and internet audio, etc. This proposed system can be implemented in either software or hardware and further embedded in related audio players.

Figure 12:
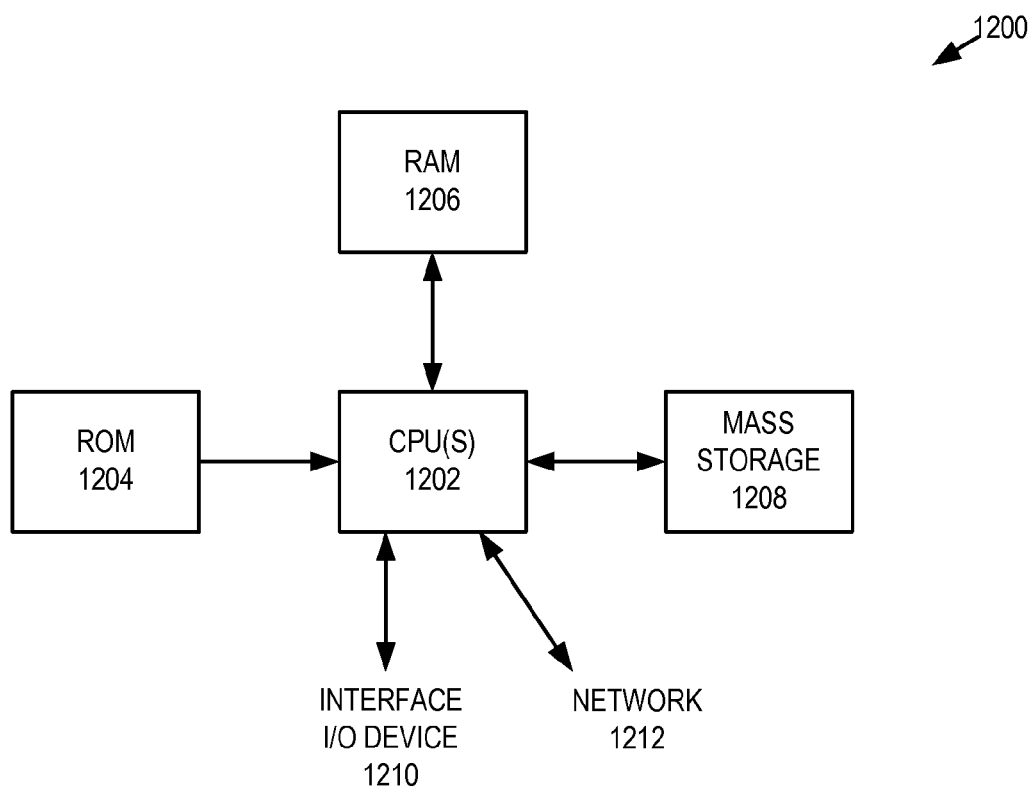
FIG. 12 is a schematic block diagram illustrating a typical computer system that can be used in connection with one or more embodiments of the present invention.

The invention also relates to using a computer system according to one or more embodiments of the present invention. FIG. 12 illustrates a typical computer system that can be used in connection with one or more embodiments of the present invention. The computer system 1200 includes one or more processors 1202 (e.g., central processing units (CPUs), digital signal processors (DSPs)) that are coupled to storage devices including primary storage 1206 (typically a random access memory, or RAM) and another primary storage 1204 (typically a read only memory, or ROM). As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media, including a computer program product comprising a machine readable medium on which is provided program instructions according to one or more embodiments of the present invention.

A mass storage device 1208 also is coupled bi-directionally to CPU 1202 and provides additional data storage capacity and may include any of the computer-readable media, including a computer program product comprising a machine readable medium on which is provided program instructions according to one or more embodiments of the present invention. The mass storage device 1208 may be used to store programs, data and the like and is typically a secondary storage medium such as a hard disk that is slower than primary storage. It will be appreciated that the information retained within the mass storage device 1208, may, in appropriate cases, be incorporated in standard fashion as part of primary storage 1206 as virtual memory. A specific mass storage device such as a CD-ROM may also pass data unidirectionally to the CPU.

CPU 1202 also is coupled to an interface 1210 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to a computer or telecommunications network using a network connection as shown generally at 1212. With such a network connection, it is contemplated that the CPU might receive information from the network, or might output information to the network in the course of performing the above-described method steps. The above-described devices and materials will be familiar to those of skill in the computer hardware and software arts.

In comparing with the prior-arts, the novelties and advantages of the proposed scheme can be summarized as follows:

(1) A new elevation processing is proposed so as to enhance the sound field expansion and brightness while being independent of the speakers' configuration (e.g., positional configuration; different/same horizontal planes/axes; different/same vertical planes/axes).

(2) The side signal is first filtered and then weighted by different/adjustable strengths separately for the two channels so as to work for both non-symmetric stereo speakers and symmetric speakers.

(3) The center signal is also filtered and then weighted by different/adjustable strengths on the bases of the distance and other spatial parameters of two channels so that the final center signal is independent of the configuration of the speakers.

(4) A novel and simple binaural signal processing scheme is designed for arbitrarily-configured loudspeakers.

The integration of one or more of the above mentioned units/blocks has widened the stereo image for both symmetric and non-symmetric stereo speakers. As a matter of fact, the proposed scheme has been shown to even work over the headphones to reduce the hearing fatigue mainly due to the proposed novel binaural signal processing unit.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A stereo widening system for a stereo signal reproducible on a pair of arbitrarily-positioned loudspeakers in a listening space, comprising:
    an elevation processing unit operable to receive the stereo signal and generate a first output signal having added elevation and enhanced sound brightness to the stereo signal and adjusted for the arbitrary-positioned loudspeakers;
    a side signal processing unit operable to receive the first output signal and generate a second output signal having a widened stereo image to the stereo signal and adjusted for the arbitrary-positioned loudspeakers; and
    a center signal processing unit operable to receive the second output signal and generate a third output signal having a further widened stereo image to the stereo signal and adjusted for the arbitrary-positioned loudspeakers.

2. The stereo widening system as recited in claim 1, wherein the elevation processing unit comprises:
    elevation processing filters operable to filter the stereo signal;
    elevation processing multipliers operable to apply weights to the filtered stereo signal, wherein the weights are adjustable according to the directions and distances from the loudspeakers to a corresponding user; and
    elevation processing adders operable to add the weighted filtered stereo signal to the stereo signal in generating the first output signal.

3. The stereo widening system as recited in claim 2, wherein the elevation processing filters are high-pass filters.

4. The stereo widening system as recited in claim 2, wherein the stereo signal and the first output signal have corresponding left and right channel signals.

5. The stereo widening system as recited in claim 2, wherein the side signal processing unit comprises:
    a side signal determination block operable to determine a side signal from the first output signal;
    a side signal filter operable to filter the side signal; and
    side signal multipliers operable to apply weights to the filtered side signal, wherein the weights are adjustable according to the directions and distances from the loudspeakers to the corresponding user; and
    side signal adders operable to add the weighted filtered side signal to the first output signal in generating the second output signal.

6. The stereo widening system as recited in claim 5, wherein the side signal filter is a band-pass filter.

7. The stereo widening system as recited in claim 5, wherein the first output signal and the second output signal have corresponding left and right channel signals.

8. The stereo widening system as recited in claim 5, wherein the center signal processing unit comprises:
    a center signal determination block operable to determine a center signal from the second output signal;
    a center signal filter operable to filter the center signal; and
    center signal multipliers operable to apply weights to the filtered center signal, wherein the weights are adjustable according to the directions and distances from the loudspeakers to the corresponding user; and
    center signal adders operable to add the weighted filtered center signal to the second output signal in generating the third output signal.

9. The stereo widening system as recited in claim 8, wherein the center signal filter is a band-pass filter.

10. The stereo widening system as recited in claim 8, wherein the second output signal and the third output signal have corresponding left and right channel signals.

11. The stereo widening system as recited in claim 1, further comprising:
    a binaural signal processing unit operable to receive the third output signal and generate a fourth output signal having a positioned sound image of the stereo signal in the listening space, wherein the binaural signal processing unit comprises ipsilateral filters and contralateral filters implemented by first order IIR filters.

12. The stereo widening system as recited in claim 11, further comprising:
   a stereo limiter unit operable to receive the fourth output signal and generate a fifth output signal having clipping minimized from the fourth output signal.

13. The stereo widening system as recited in claim 8, wherein the weights are adjusted automatically.

14. The stereo widening system as recited in claim 1, wherein the arbitrarily-positioned loudspeakers form a symmetric loudspeaker configuration.

15. The stereo widening system as recited in claim 1, wherein the arbitrarily-positioned loudspeakers form a non-symmetric loudspeaker configuration.

16. The stereo widening system as recited in claim 1, wherein the loudspeakers are integrated in a headphone.

17. A method for stereo widening of a stereo signal reproducible on a pair of arbitrarily-positioned loudspeakers in a listening space, the method comprising:
   receiving at an elevation processing unit the stereo signal and generating a first output signal having added elevation and enhanced sound brightness to the stereo signal and adjusted for the arbitrary-positioned loudspeakers;
   receiving at a side signal processing unit the first output signal and generating a second output signal having a widened stereo image to the stereo signal and adjusted for the arbitrary-positioned loudspeakers; and
   receiving at a center signal processing unit the second output signal and generating a third output signal having a further widened stereo image to the stereo signal and adjusted for the arbitrary-positioned loudspeakers.

18. The method as recited in claim 17, further comprising:
   receiving at a binaural signal processing unit the third output signal and generating a fourth output signal having a positioned sound image of the stereo signal in the listening space, wherein the binaural signal processing unit comprises ipsilateral filters and contralateral filters implemented by first order IIR filters.

19. The method as recited in claim 18, further comprising:
   receiving at a stereo limiter unit the fourth output signal and generating a fifth output signal having clipping minimized from the fourth output signal.

20. A computer program product for stereo widening of a stereo signal reproducible on a pair of arbitrarily-positioned loudspeakers in a listening space, the computer program product being embodied in a non-transitory computer readable medium and comprising computer executable instructions for:
   receiving at an elevation processing unit the stereo signal and generating a first output signal having added elevation and enhanced sound brightness to the stereo signal and adjusted for the arbitrary-positioned loudspeakers;
   receiving at a side signal processing unit the first output signal and generating a second output signal having a widened stereo image to the stereo signal and adjusted for the arbitrary-positioned loudspeakers; and
   receiving at a center signal processing unit the second output signal and generating a third output signal having a further widened stereo image to the stereo signal and adjusted for the arbitrary-positioned loudspeakers.

* * * * *